United States Patent [19]
Meier et al.

[11] Patent Number: 5,893,214
[45] Date of Patent: Apr. 13, 1999

[54] MEASURING BALL REFLECTOR

[75] Inventors: Dietrich Meier, Niedererlinsbach; Werner Schertenleib, Muhen, both of Switzerland

[73] Assignee: Leica Geosystems AG, Heerbrugg, Switzerland, CHX

[21] Appl. No.: 08/913,876

[22] PCT Filed: Jan. 17, 1997

[86] PCT No.: PCT/EP97/00216
§ 371 Date: Sep. 24, 1997
§ 102(e) Date: Sep. 24, 1997

[87] PCT Pub. No.: WO97/27453
PCT Pub. Date: Jul. 31, 1997

[30] Foreign Application Priority Data

Jan. 24, 1996 [DE] Germany .......................... 196 02 327

[51] Int. Cl.$^6$ .................................................. G01C 15/06
[52] U.S. Cl. ........................................................ 33/293
[58] Field of Search .............................. 33/502, 293, 294, 33/295, 296; 359/529, 831, 834

[56] References Cited

U.S. PATENT DOCUMENTS

| | | | |
|---|---|---|---|
| 3,663,084 | 5/1972 | Lipkins | 359/529 |
| 4,470,664 | 9/1984 | Shirasawa | 33/293 |
| 4,519,674 | 5/1985 | Buckley et al. | 33/293 |
| 5,231,539 | 7/1993 | McMillen | 359/529 |
| 5,771,099 | 6/1998 | Ehbets | 33/293 |

FOREIGN PATENT DOCUMENTS

| | | |
|---|---|---|
| 3214998 | 11/1983 | Germany . |
| 4410267 | 9/1994 | Germany . |

OTHER PUBLICATIONS

Zeitschrift Für Vermessungswesen, Jun. 1988, West Germany, Bd. 113, Nr. 6.ISSN 0340–4560, pp. 249–258.

*Primary Examiner*—G. Bradley Bennett
*Attorney, Agent, or Firm*—Foley & Lardner

[57] ABSTRACT

Measuring sphere reflector for direction measurements and/or distance measurements, which is distinguished in that there is inserted into the measuring sphere (10) a retroreflecting triple prism (17) whose base face (18) cuts out a part of the surface (11) of the measuring sphere and whose height is approximately equal to the radius of the measuring sphere (10), the center (16) of the measuring sphere (10) lying on the altitude (19) of the triple prism (17).

8 Claims, 1 Drawing Sheet

MEASURING BALL REFLECTOR

The invention relates to a measuring sphere reflector for direction measurements and/or distance measurements.

Measuring spheres are frequently used as a physical realization of a target point for geodetic and industrial coordinate measurements. They are generally metallic spheres having a specularly reflecting surface which are mounted on a pin. The pin is mounted at a coordinate point to be measured in the field or on the measurement object.

The sighting telescope of a theodolite is trained on the sphere, and the latter is sharply imaged in an image plane by focussing. The sighting direction of the theodolite is determined in terms of coordinates by aligning a collimating mark or the cross hairs with the measuring sphere. A special illuminating device on the theodolite is frequently used to increase the display accuracy, and in this case the light reflection on the specular surface of the sphere is taken as the target point.

By aiming at the same measuring sphere from a different sighting direction, for example using a further theodolite, the distance to the center of the measuring sphere can be calculated with the aid of the known separation of the two theodolites. Since the distance of the center of the sphere from the base of the retaining pin is known, the coordinates of the measuring point can be determined in this way. Determining the theodolite distance is superfluous in the standard method with simultaneous measurement of a calibration distance (calibration standard) in object space. The dimensioning of the measuring sphere reflectors and the length of the retaining pins are normalized in order to simplify the computer programs employed. The diameter of the measuring sphere is therefore 12.7 mm.

In addition to coordinate measurement via two independent measurements of direction and base distance (triangulation), it is also possible to make polar measurements, that is to say to combine a direction measurement with a distance measurement, that is to say to connect a theodolite to a telemeter. Optical absolute telemeters evaluate the transit time of light pulses or modulated light beams which are reflected at the measurement object. It is necessary, in turn, to realize the target point physically for the purpose of accurately determining the coordinates of a measuring point. Since it is mostly a light beam of parallel alignment which is employed in distance measurement, triple prisms have proved themselves as target reflectors. The latter have the property that a parallel beam entering the base face is reflected parallel to itself, irrespective of the inclination of the base face with respect to the light beam direction.

The distance is altered by a fixed addition constant in the case of vertical incidence through the glass body. The target point for the distance measurement is the vertex of the triple prism. Since this cannot be sighted optically from larger distances, for the purpose of angular measurement in geodesy, the triple prism is connected to a target board which is sighted using the theodolite. The coordinates of the measuring point can be determined from a position by using the geometrical assignment between the triple prism and target board, as well as the holder thereof relative to the measuring point.

As already mentioned, it is an essential property of the triple prism that the beam reflection is parallel to the incident beam irrespective of inclination of the base of the triple prism relative to the beam direction. The optical path length is, however, dependent on the inclination of the base face. Given an inclination about the vertex of the prism, the optical path increases in proportion to the angle of inclination in a nonlinear fashion. An identical dependence results in the case of an inclination about the base of the altitude of the triple prism, but in this case the entire optical path is reduced by the changing of the location of the vertex. This change in the optical path naturally influences the accuracy of the distance measurement. It is known that the dependence on inclination can be minimized over a certain angular range if the inclination takes place about a point lying on the altitude of the triple prism which is removed from the vertex by approximately ⅓ of the height.

In addition to visual measurement of direction combined with an absolute distance measurement, instruments are also known in which, starting from a starting position, there is automatic tracking and automatic measurement of the change in distance. The front face target point is embodied by a triple mirror which is constructed from three mutually perpendicular plane mirrors, and is arranged inside a sphere in such a way that the vertex of the reflector lies at the center of the sphere. By contrast with a triple prism, in the case of a triple mirror there are no aligning errors and distance errors which depend on the beam direction.

A collimated laser beam which is directed onto the triple mirror via a scanning mirror which can be controlled in three axes is used as the measuring beam. In the start position, which is known in terms of distance and direction, the reflected beam is guided back via the scanning mirror into the device, where it is both measured by a position-sensitive detector and fed to an interferometer. When the sphere is removed from the start position, it is necessary only to ensure that the measuring beam falls into the opening of the triple mirror. This is possible without any problem, since the diameter of the measuring beam within the limits of the intensity distribution which has dropped to $1/e^2$ is about 4 mm, while the triple mirror has an inlet opening of about 20 mm. The position-sensitive detector then makes the scanning mirror follow up behind the moving triple mirror until the latter is fixed at the desired measuring point on the measuring object. The interferometer then measures the path covered in this case. The coordinates of the measuring point can be determined from the change in direction and distance relative to the start point.

It is known from the positioning of robots which can move freely in a working space to mount retroreflectors as reference points at defined positions in the working space. Starting from a start position, the visual range of the robot is scanned using a laser beam via a scanning mirror which can be controlled in three axes, until the laser beam falls onto one of the retroreflectors. The distance to the retroreflectors is measured using an absolute telemeter. When the robot moves, the scanning mirror follows up the direction to the retroreflector, with the result that the changes in direction of the robot can be determined. If the sight to the retroreflector is lost, it is necessary to start a new target direction acquisition and to start a new measurement of the distance to another retroreflector.

DE 44 10 267 A1 discloses an arrangement for calibrating a measuring machine which measures on three coordinate axes. A reflecting cube corner with a partially spherical reference surface is fixedly arranged on a stand on the measuring table. The stand can be displaced in a guide along one of the coordinate axes of the measuring machine.

The calibration is performed on the one hand by determining the location of the reference surface of the reflecting cube corner using a contact stylus, and on the other hand measuring the longitudinal displacement of the retroreflective cube corner using an interferometer. The retroreflector has a node point which lies in the measuring axis of the interferometer and about which the retroreflector may be inclined without the distance measurement being significantly impaired. The reference surface is accurately positioned relative to the node. If a spherical reference surface is involved, it is centered relative to the node.

The node serves as a reference measuring point for the interferometric measurement, and the point where the interferometric measuring axis penetrates the spherical reference surface is used as reference measuring point for the contact stylus. The two reference measuring points thus lie one behind another in the measuring direction. Moreover, the guide track for the stand is offset parallel to the measuring axis of the interferometer. Inaccuracies in the guide track lead to a transverse offset of the node and to tilting of the retroreflector about the base of the stand, the result likewise being to displace the node.

Since the node is used as reference measuring point for the interferometric distance measurement, every transverse displacement signifies a change in the measuring direction with respect to the coordinate direction, which is to be calibrated, of the measuring machine. As precise as possible a guide track must be ensured in order to keep the measuring errors resulting therefrom as small as possible. In addition, it is possible by touching the spherical reference surface at three different positions to measure the transverse offset and to take account of the latter in a compensation calculation.

In the case of triple mirrors, it is impermissible for mechanical reasons to drop below a specific overall size, since the mirrors must have a certain thickness to be stable. Another disadvantage is that contaminants such as, for example, dust grains, can jam in the open vertex of the reflector, these being difficult to remove and also exposing the metallic reflective coating to the risk of being damaged. However, it is the reflection of the beams at the vertex of the mirror which is decisive for the measuring accuracy. Moreover, it is to be borne in mind that the quality of the inner edges of the triple mirror causes problems because of the cementing of the three plane mirror elements.

It is the object of the invention to specify a measuring sphere reflector which is suitable both for visual and for automatic determination of direction, and which can be used both for absolute distance measurement and for relative distance measurment. Moreover, it should be possible to dimension it in accordance with the standard size of known measuring sphere reflectors.

This object is achieved in a measuring sphere reflector of the type mentioned at the beginning by virtue of the fact that inserted into the measuring sphere is a retroreflecting triple prism whose base face cuts out a part of the surface of the measuring sphere and whose height is approximately equal to the radius of the measuring sphere, the center of the measuring sphere lying on the altitude of the triple prism.

Advantageous embodiments of this design follow from the features of the subclaims.

By contrast with a triple mirror composed of mirrors, a triple prism has the advantage that it can be of arbitrarily small dimension. In particular, it can be adapted optimally to the standardized diameter of a measuring sphere of 12.7 mm, it being the case at the same time that there is still a good adaptation of the size of the base face to the diameter of the laser beam for an interferometer, angular measurement and an absolute telemeter and also a special reserve for a sufficient angle of inclination with respect to the beam direction being provided.

Moreover, the problems arising with contamination of the reflector vertex are eliminated in the case of a triple prism. In addition, the edges of the triple prism can be made optimally finely.

Owing to the altitude of the triple prism which is provided according to the invention, it is possible for the fulcrum provided at the center of the sphere to be displaced into the triple prism. This renders it possible to minimize the inclination-dependent optical path differences in the triple prism.

Since, in the case of automatic coordinate measurement, the vertex of the triple prism is not only the target point for the distance measurement, but also determines the aiming direction, it had to be investigated to what extent the distance measurement is falsified in the case of inclination of the triple prism about a point situated below the vertex. Surprisingly, it turned out that the same fulcrum for which the optical path differences are minimized uniformly over the range of inclination also minimizes the angle of deviation due to migration of the vertex of the triple prism.

Since the base face of the triple prism occupies only a part of the surface of the measuring sphere, the remaining part can be of specular design, so that it continues to be possible to sight visually. If the measuring sphere is produced from a magnetic material, fastening to the usual shaft can be performed by magnetic force, the support possibly being a three-point support, with the result that the measuring sphere can be rotated in all directions. With the shaft firmly clamped at the measuring point, this permits both simple alignment with the measuring beam and an optimum setting of the specular surface to the sighting device of two different measuring instruments. Moroever, in the case of the use of a target tracking system with relative distance measurement, the measuring sphere can be displaced from one measuring point to the other.

By reducing the triangular base face of the triple prism and of the prism region adjacent thereto to a cylinder which is rotationally symmetrical to the altitude, a particularly simple assembly is provided for inserting the prism into the measuring sphere. All that is needed is to introduce into the sphere a central bore into which the triple prism is inserted. In this case, the circular base face can be terminated by the edge of the bore or be situated slightly below this edge, with the result that it is protected against damage when the measuring sphere is placed on a plane substrate.

The measuring sphere reflector according to the invention is described in more detail below with the aid of an exemplary embodiment represented diagrammatically in the drawing, in which.

Figure 1:
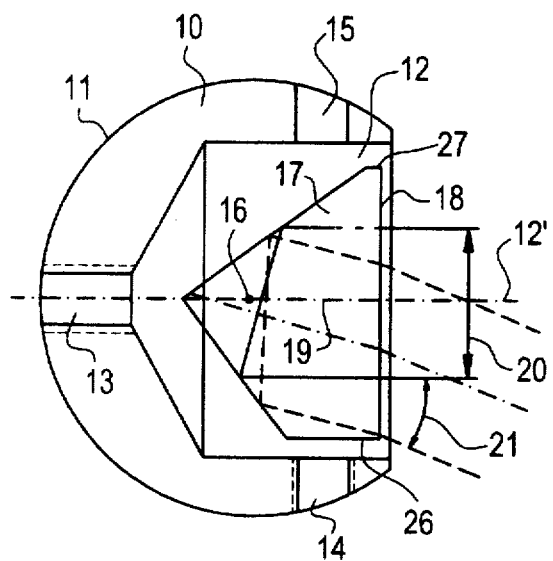
FIG. 1 shows a section through the measuring sphere reflector.

A measuring sphere 10 is represented in section in FIG. 1. It consists of a magnetic metal. Its surface 11 is polished in a specular fashion. A bore 12 is introduced centrally into the body of the sphere. The center of the body of the sphere is denoted by 16. Pointing into the bore 12 is a tapped hole 13 which is aligned with the vertex of the triple prism (still to be described). A further tapped hole 14 is perpendicular thereto. Located opposite the latter is a filling hole 15 for a cement. Further pairs 14/15 are respectively located offset by 60° on the circumference of the body of the sphere.

A triple prism 17 is inserted into the bore 12. Said prism consists of an optical glass. The roof surfaces are coated with metal and protected by safety lacquer. The base face 18 is circular. In order to be protected against damage when the measuring sphere is stored, said base face is situated on a plane face slightly deeper than the edge of the bore 12. The altitude of the triple prism 17 is denoted by 19. The center 16 of the body of the sphere is situated approximately at one third of the height of the triple prism below the vertex. Pins are turned into the tapped holes 13/14 in order to align the base face 18 of the triple prism 17 perpendicular to the axis 12' of the bore 12. In the process, it is even possible to compensate for manufacturing tolerances in the altitude of the triple prism, which lead to different optical paths in the prism, by adjusting the position of the vertex relative to the fulcrum to a uniform addition constant of the glass path. After the alignment, a suitable cement is introduced through the filling holes 15 into the bore 12 and fixes the triple prism 17, securing it against thermal stresses and vibrations. A silicone cement has proved to be particularly suitable in this case.

The measuring beam picked up by the measuring sphere reflector represented has a diameter 20. The base face 18 of the triple prism 17 can be inclined in all directions relative to this beam bundle by an angle 21, without the quality of the measuring signal derived from the reflected beam bundle being degraded, and without the accuracy of the direction measurement and distance measurement dropping out of the required tolerance range.

In a practical exemplary embodiment, it was possible to insert into a measuring sphere with a standard diameter of 12.7 mm (0.5") a triple prism which reliably reflects a measuring beam bundle with an approximate diameter of 4.5 mm within a range of inclination of ±15°. The distance error was approximately 1.5 μm in this case. The directional angle error corresponded here to a deviation of the target point of approximately ±10 μm.

Figure 2:
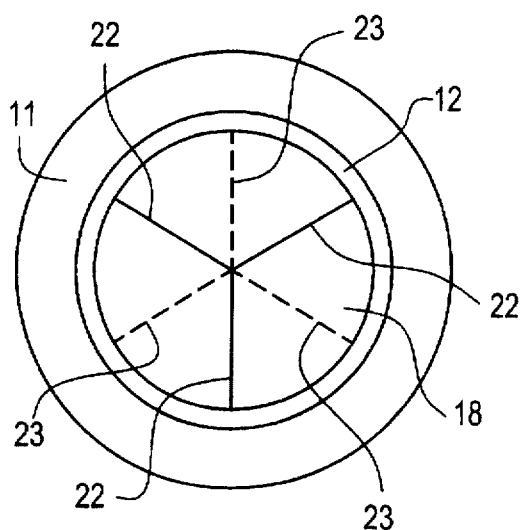
FIG. 2 shows a top view of the measuring sphere reflector.

The measuring sphere reflector is shown in FIG. 2 in a top view of the base face 18 of the triple prism 17, in order to represent the circular beam entrance surface. The roof edges 22, which converge to the vertex, and their reflections 23 on the opposite roof surfaces are visible in the top view.

Figure 3:
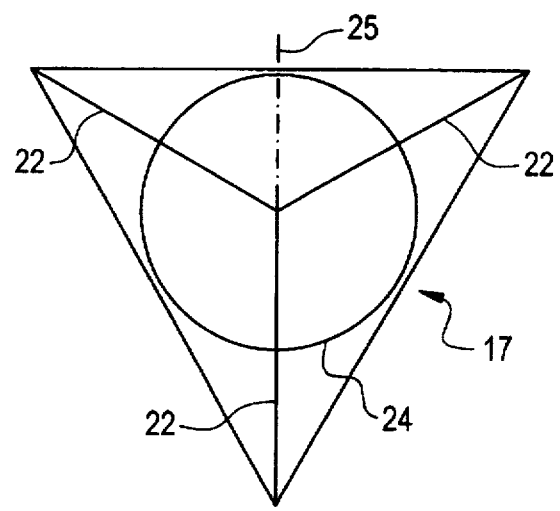
FIG. 3 shows a top view of the complete triple prism.

FIG. 3 shows a top view of the complete triple prism 17, and an inner circle 24 which is situated centrally relative to the base of the altitude below the vertex of the prism, and which forms the cross section of the cylinder to which the base of the triple prism is reduced.

Figure 4:
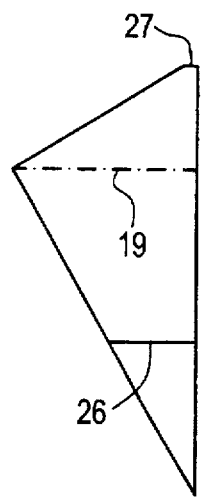
FIG. 4 shows a section through the triple prism along a roof edge.

FIG. 4 shows a cross section through the triple prism according to FIG. 3 along the line of section 25. The reduction in the base area to a cylinder in this case leads to side faces 26/27 of different height, as are also represented in FIG. 1. The adjusting pins are expediently aimed at the higher side faces 26.

We claim:

1. Measuring sphere reflector for contactless direction measurements and/or distance measurements, the measuring sphere being held in a freely rotatable fashion in a support, characterized in that inserted into the measuring sphere (10) is a retroreflecting triple prism (17) whose base face (18) cuts out a part of the surface (11) of the measuring sphere in such a way that the circumferential line of the base face (18) of the triple prism (17) is situated below the surface (11) of the measuring sphere (10), and whose height is approximately equal to the radius of the measuring sphere (10), the center (16) of the measuring sphere (10) lying on the altitude (19) of the triple prism (17).

2. Measuring sphere reflector according to claim 1, characterized in that the distance of the vertex of the triple prism (17) from the center (16) of the measuring sphere (10) is about one third of the height of the triple prism (17).

3. Measuring sphere reflector according to claim 1, characterized in that in its base region the triple prism (17) is reduced to a cylinder which is rotationally symmetrical relative to the altitude (19).

4. Measuring sphere reflector according to claim 1, characterized in that the measuring sphere (10) has a bore (12) into which the triple prism (17) is inserted.

5. Measuring sphere reflector according to claim 4, characterized in that externally accessible adjusting elements on which the triple prism (17) rests project into the bore (12).

6. Measuring sphere reflector according to claim 5, characterized in that after its adjustment the triple prism (17) is fixed in the bore (12) by a permanently elastic cement.

7. Measuring sphere reflector according to claim 1, characterized in that the surface (11) of the measuring sphere (10) is specular.

8. Measuring sphere reflector according to claim 1, characterized in that the measuring sphere (10) consists of magnetic material.

* * * * *